United States Patent Office 3,579,490
Patented May 18, 1971

3,579,490
METHOD OF PRODUCING RESINS FOR USE IN ADHESIVES
Stanley Kordzinski, deceased, late of Old Bridge, N.J., by Eileen Kordzinski, executrix, Old Bridge, and Milton B. Horn, Plainfield, N.J., assignors to Ashland Oil & Refining Company, Ashland, Ky.
No Drawing. Continuation-in-part of abandoned application Ser. No. 20,822, Apr. 8, 1960. This application Aug. 31, 1964, Ser. No. 393,433
Int. Cl. C08f 15/14, 15/18, 15/20
U.S. Cl. 260—80.72
11 Claims

ABSTRACT OF THE DISCLOSURE

A tacky and pressure sensitive adhesive comprising one or more aliphatic esters of acrylic, methacrylic and acetic acid together with one or more of glycidyl acrylate, glycidyl methacrylate or glycidyl allyl ether is disclosed. The proportions of monomeric ingredients are selected to give a calculated glass transition temperature from about −20° C. to about −55° C. The monomeric system is copolymerized at a temperature not exceeding about 100° C. in order to keep the glycidyl compounds intact during polymerization.

---

This application is a continuation-in-part of our earlier copending application Ser. No. 20,822 filed on Apr. 8, 1960 and now abandoned.

This invention relates to copolymer resins having high tack, high cohesive strength and high molecular weight, these properties making the copolymers especially useful in pressure sensitive adhesives.

In accordance with the invention, we have now discovered that valuable pressure sensitive adhesive resins can be made by copolymerizing, at temperatures not exceeding about 100° C., at least one monomer consisting of certain polymerizable alkyl esters having a single vinyl group per molecule with at least one other monomer consisting of certain polymerizable glycidyl compounds also having a single vinyl group per molecule, provided that the relative proportions of the monomers are selected to yield a final copolymer having a calculated glass transition within the range from about −15° C. to about −55° C.

While we are not entirely certain as to the underlying reasons, we have found that each of the foregoing limitations is critical and necessary for making copolymers having value as or in pressure sensitive adhesives.

It is generally known that the properties of high tack, high cohesive strength and high molecular weight are very desirable for adhesive resins. Apparently, if the glass transition of the copolymers of our invention is controlled within the range from about −15° C. to about −55° C., the copolymer resin will virtually assuredly possess the function of high surface tack. However, this alone is not sufficient for utility as a pressure sensitive adhesive resin which also must have a high cohesive strength. In the copolymers of our invention, this function is apparently provided by the epoxy groups which become integral units of the copolymer chain by use of the polymerizable glycidyl compound and which upon reaction with themselves or with other reactive residues, after polymerization has been completed, give a cross-linking effect in the copolymer. Apparently by such cross-linking, the final copolymer acquires a high cohesive strength and an increased molecular weight and thereby becomes highly suitable for use as or in pressure sensitive adhesives.

Accordingly, it is essential that the epoxy groups be preserved or maintained substantially intact until the formation of the copolymer has been completed, and the copolymerization temperatures are therefore controlled to not exceed about 100° C. to minimize premature reaction at the epoxy groups.

In carrying out our invention, we have achieved best results with use of the polymerizable alkyl esters consisting of methyl acrylate, ethyl acrylate, n-butyl acrylate, 2-ethyl-hexyl acrylate and vinyl acetate. Other polymerizable esters having a single vinyl group per molecule which can be used are hexyl methacrylate, lauryl methacrylate and octyl methacrylate. However, the second group of monomers used alone gives the least beneficial results, so that in general we prefer that at least one of the polymerizable esters be selected from the first group given above and, for the very best results, all of the polymerizable esters should be selected from the first group.

As for the polymerizable glycidyl compound, this may be glycidyl arcylate, glycidyl methacrylate or glycidyl allyl ether, each of which has a single vinyl group per molecule and provides reactive epoxy groups in the copolymer structure. The glycidyl compound in general may be used in amounts from about 0.5% to about 15% of the weight of the copolymer to provide the necessary proportion of epoxy groups for a crosslinking reaction in the final copolymer after completion of polymerization. This reaction which is induced by heating the copolymer above 100° C., may take place between only epoxy groups or between epoxy and the other groups supplied by additional materials compounded with the copolymer in conventional manner to make a commercial product.

As previously mentioned, the relative proportions of the various monomers should be selected to yield a copolymer having a calculated glass transition within the range about −15° C. to about −55° C.

This may be done by use of the formula:

$$\frac{1}{Tg} = \frac{W_1}{Tg_1} + \frac{W_2}{Tg_2} + \cdots \frac{W_n}{Tg_n}$$

in which $Tg$ = calculated glass transition of copolymer (° K.)
$Tg_1$ = glass transition of homopolymer of first monomer (° K.)
$W_1$ = weight percent of first monomer in copolymer.
$Tg_2$ = glass transition of homopolymer of second monomer (° K.)
$W_2$ = weight percent of second monomer in copolymer.
$n$ = the number of additional monomers used beyond two.

The glass transitions of each of the polymerizable alkyl esters which as previously defined may be used in this invention are available as published data in the art. While the glass transitions of the glycidyl compounds used in our invention are not similarly available, we have determined that the effect of the glycidyl compound upon the glass transition of the final copolymer is very much similar to that of the homopolymer of methyl methacrylate which has a glass transition of about 378° K. Hence, this value can be used in the foregoing equation to account for the presence of one or more glycidyl compounds in the copolymers of our invention in the amounts of about 0.5% to about 15% of the weight of the copolymer.

Assume, for example, that in accordance with our invention a copolymer of ethyl acrylate, lauryl methacrylate and 1% by weight of glycidyl methacrylate is to be made having a calculated glass transition of −30° C. (243° K.). The glass transitions of the homopolymers of ethyl acrylate and lauryl methacrylate are respectively −22° C. (251° K.) and −65° C. (208° K.), and as noted above 378° K. may be used for the glycidyl compound. The calculation to determine the relative amounts of the first two monomers proceeds as follows:

$W_1$=Weight percent of the ethyl acrylate in the final copolymer.

$W_2$=Weight percent of the lauryl methacrylate in the final copolymer.

$W_3$=Weight of the glycidyl methacrylate in the final copolymer.

$$W_3 = .01, W_2 = 1.0 - .01 - W_1 \text{ or } W_2 = .99 - W_1$$

$$\frac{1}{Tg} = \frac{W_1}{Tg_1} + \frac{W_2}{Tg_2} + \frac{W_2}{Tg_3}$$

$$\frac{1}{Tg} = \frac{W_1}{Tg_1} + \frac{.99 - W_1}{Tg_2} + \frac{.01}{Tg_3}$$

$$\frac{1}{243° K.} = \frac{W_1}{251° K.} + \frac{.99 - W_1}{208° K.} + \frac{.01}{378° K.}$$

$$W_1 = 81\%, W_2 = 18\%$$

Accordingly, the copolymerization of 1% glycidyl methacrylate, 81% ethyl acrylate and 18% lauryl methacrylate at a temperature not exceeding 100° C. will yield a copolymer resin having the necessary properties of high tack, high cohesive strength and molecular weight for use in pressure sensitive adhesive resins.

In preparing the copolymers, solution or emulsion polymerization techniques may be employed. In the first procedure, the monomers are mixed and dissolved in one or more organic solvents such as alcohols, ketones or esters. The usual form of catalyst for vinyl-type polymerization, for example, a peroxide, hydroperoxide, or an azo compound is added and then the mixture is heated to bring about copolymerization. As has been previously noted, the reaction temperature should not be permitted to exceed about 100° C. in order to minimize any reaction of the epoxy groups provided by the glycidyl compound. In the case of emulsion polymerization, the procedures are very much similar except that the reaction is carried out in water or other non-solvent with the usual emulsifiers and redox catalysts, for example, combinations of inorganic persulfate and sulfite salts.

The copolymers prepared in accordance with the above procedures may be compounded in known matter with other ingredients such as softeners, fillers, tackifiers and cross-linking agents such as polyfunctional acids or acid anhydrides, polyfunctional amines, dicyandiamide, phenol alcohols and glycols. Where such cross-linking agent has been added, the epoxy groups on the copolymer will react therewith, during the time the copolymer is being heated and filmed out over a substrate to make, for example, pressure sensitive adhesive tape, whereby the copolymer becomes mildly cross-linked to acquire a high cohesive strength and molecular weight.

Where no cross-linking agent has been added, the reaction will occur primarily between epoxy groups and perhaps with reactive residues unavoidably introduced during preparation of the copolymer. It is a particularly valuable feature of our invention that, due to this minor cross-linking via epoxy groups, higher molecular weight copolymers can be achieved than is normally possible with solution or emulsion polymerization.

Further details of our invention will be evident from the following illustrative examples which constitute preferred embodiments thereof.

EXAMPLE 1

A mixture of the following monomers:

| | Parts |
|---|---|
| Ethyl acrylate | 352½ |
| 2-ethylhexyl acrylate | 352½ |
| Vinyl acetate | 352½ |
| Glycidyl methacrylate | 8.7 | are added in a suitable vessel to 1060 parts of acetone and 2.2 parts of benzoyl peroxide. The vessel is heated to reflux and reacted with agitation for 8 hours. It is then further diluted with 400 parts of acetone and further reacted to reflux for 4 hours more. The resulting solution of copolymer resin has the following properties:

Viscosity—200 poises
Solids—38%

Films made of the copolymer by evaporation of the solvent are inherently tacky and have excellent cohesive and adhesive properties.

The glass temperature of the copolymer resin was calculated in accordance with the method prescribed above and found to be —17° C.

EXAMPLE 2

A mixture of the following monomers:

| | Parts |
|---|---|
| Vinyl acetate | 913 |
| Ethyl acrylate | 462 |
| 2-ethylhexyl acrylate | 1353 |
| Glycidyl methacrylate | 22 | is added by slow addition under reflux conditions to 331 parts of water with stirring. 9½ parts of an alkylaryl sulfonate emulsifier were used and 3½ parts of water soluble persulfate catalyst were included in the water phase. In this example the alkylaryl sulfonate emulsifier was a sodium salt of alkylaryl polyether sulfonate made by Rohm and Haas and sold under the trade name Triton X200. The water soluble persulfate catalyst used was ammonium persulfate.

To the resultant slurry there was added 2020 parts of toluene and the water was removed from the mixture by azeotropic distillation under partial vacuum.

The resulting toluene solution of the copolymer had the following properties:

Visocity—200 poises
Solids—25%

The film of the copolymer made by evaporation of the solvent had high tack and adhesion and high cohesive strength. The resin is an excellent base for the compounding of pressure sensitive adhesives. The glass temperature of the copolymer resin was calculated in accordance with the method prescribed above and found to be —24° C.

EXAMPLE 3

A mixture of the following monomers is made:

| | Parts |
|---|---|
| Ethyl acrylate | 2038 |
| 2-ethylhexyl acrylate | 2038 |
| Acrylic acid glacial | 84 |
| Glycidyl methacrylate | 42 |

In this example reaction is carried on with emulsion polymerization. The emulsion bath is made up as follows:

| | Parts |
|---|---|
| Deionized water | 5000 |
| Sodium bicarbonate | 2.5 |
| Emulsifier | 385 |

In this case the emulsifier consisted of 115 parts of an octyl phenol reacted with ethylene oxide having a 10:1 mol ratio of ethylene oxide to the octyl phenol and 270 parts of a similar product but having a 30:1 mol ratio of ethylene oxide to the octyl phenol. The material having the 10:1 mol ratio is sold by Rohm & Haas under the name of Triton X100 and the other is made by Rohm & Haas and sold under the name of Triton X305. To the foregoing mixture of water and emulsifier one quarter of the reactants is added and the resulting mixture is sparged with nitrogen ($CO_2$ can be used) to remove the oxygen and then catalyzed with a two part redox catalyst consisting of 9 parts of ammonium persulfate and 9.5 parts of sodium metabisulfate. After an induction period the temperature in the vessel rose, due to exothermic polymerization. After the peak temperature had been reached the remainder of the monomer mixture is added by slow addition so that the reaction temperature is maintained. The resulting copolymer had the following properties:

Viscosity, at 25° C.—110 centipoises
Solids—47%

A film of this product had high tack and adhesion properties suitable for formulation into a pressure sensitive adhesive with the addition of small amounts of tackifiers and/or softener. The glass temperature of the copolymer resin was calculated in accordance with the method prescribed above and found to be —40° C.

EXAMPLE 4

To a suitable vessel is added:

| | Parts |
|---|---|
| Ethyl acrylate | 132.25 |
| 2-ethyl hexyl acrylate | 132.25 |
| Vinyl acetate | 132.25 |
| Glycidyl methacrylate | 1.63 |
| Methachylic acid | 1.95 |

To this is added 400 parts of acetone and 3.2 parts of benzoyl peroxide. The mixture is reacted at reflux with stirring for 3 hours. 200 parts more of acetone are then added and continued at reflux for 10 more hours. The resulting solution of copolymer resin has the following properties:

Viscosity at 25° C.—60 centipoises
Solids—46%

The glass temperature of the copolymer resin was calculated in accordance with the method prescribed above and found to be —18° C.

EXAMPLE 5

To a suitable reaction vessel is charged:

| | Parts |
|---|---|
| Ethyl acrylate | 297 |
| 2-ethylhexyl acrylate | 99 |
| Glycidyl methacrylate | 3 |
| Acetone | 400 |
| Benzoyl peroxide | 1.6 |

This is reacted with stirring at reflux for 2 hours. It is then diluted with 600 parts of acetone and further reacted for 6 more hours. The copolymer resin has the following properties.

Viscosity at 25° C.—9700 centipoises
Solids—25%

The film is extremely tough and tacky and can be compounded into high quality pressure sensitive adhesives with high internal strength. The glass temperature of the copolymer resin was calculated in accordance with the method prescribed above and found to be —30° C.

EXAMPLE 6

In a suitable flask mix:

| | Parts |
|---|---|
| Vinyl acetate | 170 |
| Butyl acrylate | 230 |
| Benzoyl peroxide | 1.25 |
| Glycidyl acrylate | 0.25 |
| Ethyl acetate | 598.5 |

The mixture is heated and agitated. A mild reflux is maintained for 15 hours. At the end of this time polymerization is virtually complete. The product is a clear, viscous resin with a polymer content of over 39% and a calculated glass temperature of —25° C. Films of the resin made by evaporating the ethyl acetate are normally tacky and have high cohesive strength.

It will be understood that it is intended to cover all changes and modifications of the preferred embodiments of the invention, herein chosen for the purpose of illustration, which do not depart from the spirit and scope of the invention.

We claim:

1. The method of forming a tacky, pressure sensitive adhesive copolymer resin by conjointly polymerizing, in solution or emulsion, two or more copolymerizable monomers in the presence of a catalytically effective amount of a conventional polymerization catalyst, which comprises copolymerizing at a temperature not exceeding about 100° C., a monomeric system consisting essentially of at least one polymerizable monomer selected from the group consisting of vinyl acetate, the methyl, ethyl, n-butyl and 2-ethylhexyl esters of acrylic acid, and the hexyl, octyl and lauryl esters of metacrylic acid, with at least one copolymerizable glycidyl compound monomer selected from the group consisting of glycidyl acrylate and glycidyl allyl ether, the amount of said glycidyl monomer being from about 0.5% to about 15% of the total weight of all said monomers that are used and the relative amounts of all said monomers that are used being selected to yield a copolymer resin having a calculated glass transition within the range from —20° C. to about —55° C.

2. A method as in claim 1 wherein, after polymerization has been completed, said copolymer resin is heated above 100° C. to cause reaction of the epoxy groups provided by said glycidyl monomer, whereby said copolymer resin is internally cross-linked to achieve a high cohesive strength and molecular weight.

3. The method of forming a tacky, pressure sensitive adhesive copolymer resin by conjointly polymerizing, in solution or emulsion, two or more copolymerizable monomers in the presence of a catalytically effective amount of a conventional polymerization catalyst, which comprises copolymerizing at a temperature not exceeding about 100° C. a monomeric system consisting essentially of glycidyl methacrylate alone or admixed with at least one of glycidyl acrylate and glycidyl allyl ether, with the following copolymerizable monomers:

(a) any one of (1) ethyl acrylate, (2) 2-ethylhexyl acrylate, (3) n-butyl acrylate and 2-ethylhexyl acrylate admixed, (4) ethyl acrylate, n-butyl acrylate and 2-ethylhexyl acrylate admixed, each of said (a)(1), (2), (3) and (4) being used alone or in admixture with at least one of vinyl acetate, methyl acrylate, hexyl, octyl and lauryl methacrylate; or (b) any one of (1) n-butyl acrylate, (2) ethyl acrylate and n-butyl acrylate admixed, (3) ethyl acrylate and 2-ethyl hexyl acrylate admixed, each of said (b)(1), (2) and (3) being in admixture with at least one of vinyl acetate, methyl acrylate, hexyl, octyl and lauryl methacrylate; or (c) at least one of vinyl acetate, methyl acrylate, hexyl, octyl and lauryl methacrylate;

the amount of said glycidyl monomer being from about 0.5% to about 15% of the total weight of all said monomers that are used and the relative amounts of all said monomers that are used being selected to yield a copolymer resin having a calculated glass transition within the range from —20° C. to about —55° C.

4. A method as in claim 3 wherein, after polymerization has been completed, said copolymer resin is heated above 100° C. to cause reaction of the epoxy groups provided by said glycidyl monomer, whereby said copolymer resin is internally cross-linked to achieve a high cohesive strength and molecular weight.

5. The method of forming a tacky, pressure sensitive adhesive copolymer resin by conjointly polymerizing, in solution or emulsion, two or more copolymerizable monomers in the presence of a catalytically effective amount of a conventional polymerization catalyst, which comprises copolymerizing at a temperature not exceeding about 100° C. a monomeric system consisting essentially of at least one polymerizable monomer selected from the group consisting of vinyl acetate, and the methyl, ethyl, n-butyl and 2-ethylhexyl esters of acrylic acid, with a copolymerizable glycidyl monomer selected from the group consisting of glycidyl acrylate and glycidyl allyl ether, the amount of said glycidyl monomer being from about 0.5% to about 15% of the total weight of all said monomers that are used and the relative amounts of all said monomers that are used being selected to yield a copolymer resin having a calculated glass transition within the range from —20° C. to about —55° C.

6. The method of forming a tacky, pressure sensitive adhesive copolymer resin by conjointly polymerizing, in solution or emulsion, two or more copolymerizable monomers in the presence of a catalytically effective amount of a conventional polymerization catalyst, which comprises copolymerizing at a temperature not exceeding about 100° C. a monomeric system consisting essentially of glycidyl methacrylate alone or admixed with at least one of glycidyl acrylate and glycidyl allyl ether, with the following copolymerizable monomers:

(a) any one of (1) ethyl acrylate, (2) 2-ethylhexyl acrylate, (3) n-butyl acrylate and 2-ethylhexyl acrylate admixed, (4) ethyl acrylate, n-butyl acrylate and 2-ethylhexyl acryalte admixed, each of said (a)(1), (2), (3) and (4) being used alone or in admixture with at least one of vinyl acetate and methyl acrylate; or (b) any one of (1) n-butyl acrylate, (2) ethyl acrylate and n-butyl acrylate admixed, (3) ethyl acrylate and 2-ethylhexyl acrylate admixed, each of said (b)(1), (2) and (3) being used in admixture with at least one of vinyl acetate and methyl acrylate; or (c) at least one of vinyl acetate and methyl acrylate, the amount of said glycidyl monomer being from about 0.5% to about 15% of the total weight of all said monomers that are used and the relative amounts of all said monomers that are used being selected to yield a copolymer resin having a calculated glass transition within the range from —20° C. to about —55° C.

7. A tacky and pressure sensitive copolymer consisting essentially of at least one polymerizable monomer selected from the group consisting of vinyl acetate, the methyl, ethyl, n-butyl and 2-ethylhexyl esters of acrylic acid, and the hexyl, octyl and lauryl esters of methacrylic acid, and of at least one copolymerizable glycidyl monomer selected from the group consisting of glycidyl acrylate and glycidyl allyl ether, the amount of said glycidyl monomer being from about 0.5% to about 15% of the total weight of all said monomers that are used and the relative amounts of said monomers that are used being selected to yield a copolymer resin having a calculated glass transition within the range from —20° C. to about —55° C., said copolymer having intact epoxy groups which comprise a substantial proportion of the total number of epoxy groups donated by said glycidyl monomer, reaction of said intact epoxy groups having been prevented by controlling the copolymerization temperature to not over about 100° C.

8. A tacky and pressure sensitive copolymer consisting essentially of glycidyl methacrylate alone or admixed with at least one of glycidyl acrylate and glycidyl allyl ether, and of the following copolymerizable monomers:

(a) any one of (1) ethyl acrylate, (2) 2-ethylhexyl acrylate, (3) n-butyl acrylate and 2-ethylhexyl acrylate admixed, (4) ethyl acrylate, n-butyl acrylate and 2-ethylhexyl acrylate admixed, each of said (a)(1), (2), (3) and (4) being present alone or admixed with at least one of vinyl acetate, methyl acrylate, hexyl, octyl and lauryl methacrylate; or (b) any one of (1) n-butyl acrylate, (2) ethyl acrylate and n-butyl acrylate admixed, (3) ethyl acrylate and 2-ethylhexyl acrylate admixed, each of said (b)(1), (2) and (3) being admixed with at least one of vinyl acetate, methyl acrylate, hexyl, octyl and lauryl methacrylate; or (c) at least one of vinyl acetate, methyl acrylate, hexyl, octyl and lauryl methacrylate, the amount of said glycidyl monomer being from about 0.5% to about 15% of the total weight of all said monomers that are used and the relative amounts of all said monomers that are used being selected to yield a copolymer resin having a calculated glass transition within the range from —20° C. to about —55° C., said copolymer having intact epoxy groups which comprise a substantial proportion of the total number of epoxy groups donated by said glycidyl monomer, reaction of said intact epoxy groups having been prevented by controlling the copolymerization temperature to not over about 100° C.

9. A tacky and pressure-sensitive crosslinked adhesive copolymer consisting of (a) 48.5% by weight of acrylic acid ester consisting of 2-ethylhexyl acrylate having 11 carbon atoms per molecule, (b) 48.5% by weight of a lower alkyl acrylate consisting of ethyl acrylate, (c) 2.0% by weight of an acid consisting of acrylic acid, (d) 1.0% by weight of a glycidyl ester consisting of glycidyl methacrylate.

10. A pressure-sensitive adhesive composition comprising the copolymer of claim 9.

11. A process of preparing a pressure-sensitive copolymer capable of crosslinking at room temperature which comprises heating together at a temperature below 100° C. in the presence of 0.44% of an addition free-radical polymerization catalyst, a mixture of (a) 48.5% by weight of 2-ethylhexyl acrylate having 11 carbon atoms per molecule, (b) 48.5% by weight of a lower alkyl acrylate consisting of ethyl acrylate, (c) 2.0% by weight of an acid consisting of acrylic acid, and (d) 1.0% by weight of a glycidyl ester consisting of glycidyl methacrylate.

References Cited
UNITED STATES PATENTS

| | | | |
|---|---|---|---|
| 2,556,075 | 6/1951 | Erickson | 260—80.5C |
| 2,606,810 | 8/1952 | Erickson et al. | 260—86.1 |
| 2,788,339 | 4/1957 | Rothrock et al. | 260—85.7 |
| 2,884,126 | 4/1959 | Ulrich | 260—86.1 |
| 3,025,181 | 3/1962 | Nuessle et al. | 260—80.5C |
| 3,040,010 | 6/1962 | Shokae | 260—85.7 |
| 3,201,497 | 8/1965 | Heino | 260—85.7 |
| 3,242,123 | 3/1966 | Mayfulil et al. | 260—86.1 |

HARRY WONG, JR., Primary Examiner

U.S. Cl. X.R.

117—122; 161—167; 206—51; 260—31.2, 32.8, 33.6, 47, 78.5, 85.7, 86.1

UNITED STATES PATENT OFFICE
CERTIFICATE OF CORRECTION

Patent No. 3,579,490          Dated May 18, 1971

Inventor(s) Stanley Kordzinski & Milton B. Horn

It is certified that error appears in the above-identified patent and that said Letters Patent are hereby corrected as shown below:

In the References Cited:

"Shokae" should read --Shokal--

"Mayfulil et al." should read --Mayfield et al.--

"Fryling et al. 3,058,947" has been omitted.

Signed and sealed this 17th day of August 1971.

(SEAL)
Attest:

EDWARD M. FLETCHER, JR.
Attesting Officer

WILLIAM E. SCHUYLER, JR.
Commissioner of Patents